United States Patent [19]

Martin

[11] Patent Number: 5,251,797
[45] Date of Patent: Oct. 12, 1993

[54] EYELET THREADING AID

[76] Inventor: Glenn A. Martin, 4623 W. Whitten St., Chandler, Ariz. 85226

[21] Appl. No.: 833,453

[22] Filed: Jan. 22, 1992

[51] Int. Cl.⁵ .................. D05B 87/00; A01K 69/00; F21V 33/00
[52] U.S. Cl. ........................................ 223/99; 43/4.5; 362/253; 362/109
[58] Field of Search ............... 223/99; 362/109, 119, 362/120, 57, 253; 43/4.5, 4; 112/222, 223, 224

[56] References Cited

U.S. PATENT DOCUMENTS

| | | |
|---|---|---|
| 1,293,660 | 2/1919 | Armstrong . |
| 2,306,419 | 12/1942 | Worth .................. 240/6.46 |
| 2,323,292 | 7/1943 | Bloodgood ............... 240/2 |
| 2,411,118 | 11/1946 | Schuster ................... 223/99 |
| 2,791,676 | 5/1957 | Cote ......................... 362/119 |
| 2,804,710 | 9/1957 | Stilwell ........................ 43/1 |
| 3,965,605 | 6/1976 | Allen .............................. 43/1 |
| 4,085,437 | 4/1978 | Hrdlicka et al. ............ 362/109 |
| 4,667,860 | 5/1987 | Feuerman ................... 223/99 |
| 4,720,026 | 1/1988 | Feurman ................. 223/99 X |
| 4,972,979 | 11/1990 | Gordon ...................... 223/99 |
| 5,003,437 | 3/1991 | Barret ....................... 362/109 |
| 5,083,247 | 1/1992 | Robinson et al. ......... 362/109 |

*Primary Examiner*—Clifford D. Crowder
*Assistant Examiner*—Bibhu Mohanty
*Attorney, Agent, or Firm*—Charles E. Cates

[57] ABSTRACT

A device for threading an eyelet, e.g., a fish hook or needle, has a resiliently deformable loop attached to a pen light such that the loop and the eyelet are in the path of the light beam to illuminate the process of inserting the loop, catching the line to be threaded and pulling it through the eyelet. The lens of the pen light is solid and the end or base of the loop means is embedded in the lens material.

18 Claims, 1 Drawing Sheet

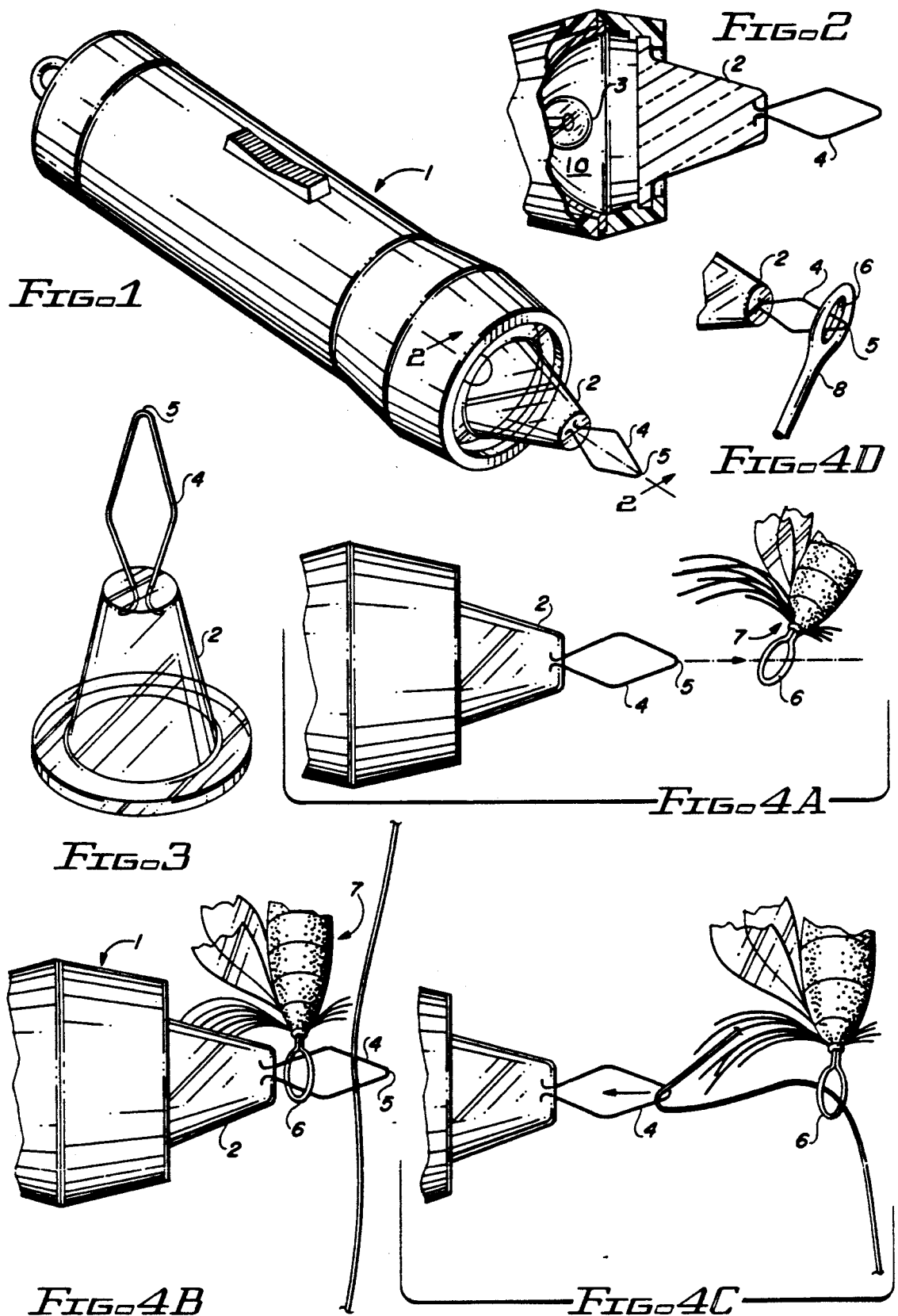

EYELET THREADING AID

This invention relates to hook threading aids for fly fishing and needle threading aids for sewing.

BACKGROUND

Fly fishing enthusiasts know that the best time of day for fishing is at dawn or dusk. However, in the dim light conditions during these hours it is difficult to thread the fishing line (leader or tippet) material through the eyelets of small hooks to secure the fly. This is especially true for persons whose eyesight is impaired due to disease or injury.

The threading process is also hindered when excess head cement or fly tying materials obstruct the eyelet of the hook.

This same device may be used by sewing enthusiasts to thread needles where additional light is needed on the eyelet of the needle.

SUMMARY OF THE INVENTION

This invention is useful in several ways in solving the problems: clearing the hook eyelet, providing a light at the point of need, and providing a much larger loop to receive the fishing line.

The invention is an apparatus for threading an eyelet of any suitable instrument such as a needle, a fish hook and the like. The apparatus has two essential parts which are a lamp or lamp means, for example a pen light or pocket light such as may be purchased from the Industrial Safety and Security Company under the trademark "Mity Light", Mag Instrument Inc., 1635 T South Sacramento Avenue, Ontario, California, under the trademark "Maglite"; and Flex-Lite Inc. division of Lukens Inc. 3515 East Kilgore Road, Kalamazoo, MI. 49001 under the trademark "Flex-lite". G.T. Price Products Inc., Eveready Battery Co. Div. of Ralston Purina and Ray-O-Vac Corp. also make suitable hand-held lamp means.

The second element is an eyelet threading device carried by the lamp means in the ambit of the light, whereby the source of light illuminates the eyelet threading device and the vicinity of the eyelet of the needle, hook or other instrument to be threaded. In a presently preferred embodiment the lamp has means for directing a focused beam of light and the threading device is in the path of the focused beam. The threading device is a resiliently deformable loop coming toward a point at its leading edge, preferably made of spring steel but which may also be made of plastic. A translucent covering or lens, which may be a clear plastic, and preferably solid, covers the source of light, e.g. an incandescent bulb and the loop has a base for attachment to the lens, preferably being embedded in a solid lens.

BRIEF DESCRIPTION OF THE DRAWINGS

Turning now to the drawings in which a presently preferred embodiment of the invention is illustrated:

FIG. 1 is a perspective view of the apparatus;

FIG. 2 is a partial view of the apparatus of FIG. 1 partially broken away;

FIG. 3 is an isolated view of the covering for the light source; and

FIGS. 4A-4D show the method of utilizing the invention to thread the eyelet of a small hook or needle.

DETAILED DESCRIPTION OF THE PREFERRED EMBODIMENTS

There is a source of light, here a bulb, in a small flashlight (e.g., penlight) energized by a battery in a conventional way.

The usually hollow lens of the flashlight 1 is preferred to be made as a solid, molded or machined lens 2 made of clear plastic or acrylic material. The new solid lens 2 will incorporate a spring steel threading loop 4 in casting as part of the lens. The loop 4 lies in the path of the beam.

The loop 4 may alternatively be a strong, resilient plastic.

The loop comes toward a point at its leading edge 5. It should be of a gauge sized to allow the clearing of the eyelet 6 of the hook 7 of most debris, but not so large that it cannot fit into the eyelet of a small hook (for example, a #22).

A means for focusing and directing the beam is parabolic reflector 10, usually a standard part of a pen light.

Now referring to FIGS. 4A-4D, in the method of use, the flashlight 1 is turned on, the threading loop is inserted in the eyelet 6 of the hook 7 or needle 8, and the fishing line or sewing thread (not shown) is passed through the loop 4. When the loop 4 is withdrawn, the fishing line or thread will be pulled with it through the eyelet and the eyelet thus threaded. The knot can then be tied in the traditional manner.

Whereas a presently preferred embodiment of the invention has been described and illustrated, persons ordinarily skilled in the art will understand that various equivalent embodiments may be employed, all of which are embraced in the appended claims.

What is claimed is:

1. Apparatus for threading an eyelet comprising:
   a. means for threading an eyelet;
   b. lamp means for illuminating an eyelet and said means for threading an eyelet; wherein
   c. said means for threading an eyelet and lamp means are moveable as a unit with respect to the eyelet while threading the eyelet wherein said means for threading an eyelet further comprise means for piercing the eyelet to insert the thread.

2. Apparatus of claim 1 wherein said means for threading an eyelet comprises a resiliently deformable loop coming toward a point on its leading edge.

3. Apparatus of claim 2 wherein said loop is spring steel.

4. Apparatus of claim 1 wherein said lamp means is a pen light.

5. Apparatus of claim 2 wherein said lamp means is a pen light.

6. Apparatus of claim 4 wherein said pen light further comprises a lens covering said lamp means and a resiliently deformable loop is attached to said lens.

7. Apparatus for threading an eyelet comprising lamp means carrying (a) a source of light and (b) means disposed in the path of said light and insertable into an eyelet for carrying thread through an eyelet, whereby said source of light illuminates the insertable means and the eyelet while threading.

8. The apparatus of claim 7 further comprising means for directing a focused beam of light on said insertable means.

9. Apparatus of claim 7 wherein said insertable means comprises a resiliently deformable loop coming to a point on its leading edge and adapted to compress to pass through the eyelet of the hook and resume its former loop shape to receive a line in said loop, whereby when retracted from the eyelet, said loop draws the line through the eyelet.

10. Apparatus of claim 7 wherein said source of light further comprises a translucent covering which carries said insertable means.

11. Apparatus of claim 9 wherein said loop is spring steel.

12. Apparatus of claim 7 wherein said source of light is a pen light.

13. Apparatus for threading an eyelet comprising lamp means emitting a source of light, a translucent covering for said source of light and a means for carrying thread through an eyelet attached to said translucent covering; whereby said source of light illuminates the threading device and the eyelet which the threading device operates on.

14. The apparatus of claim 13 further comprising means for directing a focused beam of light and said means for threading an eyelet being in the path of said beam.

15. Apparatus of claim 13 wherein said means for threading an eyelet comprises a resiliently deformable loop coming to a point on its leading edge and adapted to compress to pass through the eyelet of the hook and resume its former loop shape to receive a line in said loop, whereby when retracted from the eyelet, said loop carries the line through said eyelet.

16. Apparatus of claim 13 wherein said translucent covering is a clear plastic lens.

17. Apparatus of claim 15 wherein said loop is spring steel.

18. Apparatus of claim 13 wherein said source of light is a pen light.

* * * * *